April 16, 1968     P. C. NELSON ET AL     3,377,887
TURRET PUNCH PRESS
Filed May 11, 1965     3 Sheets-Sheet 1
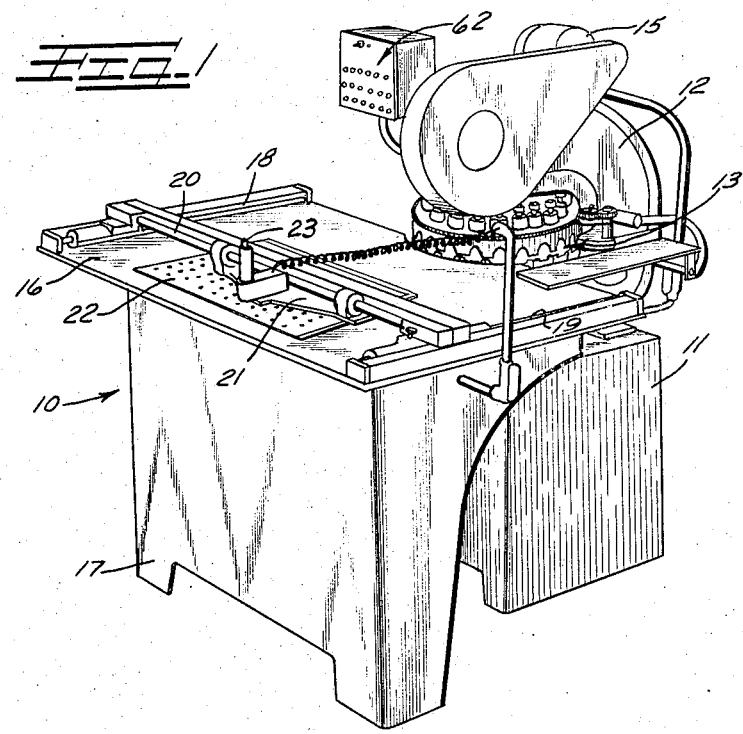
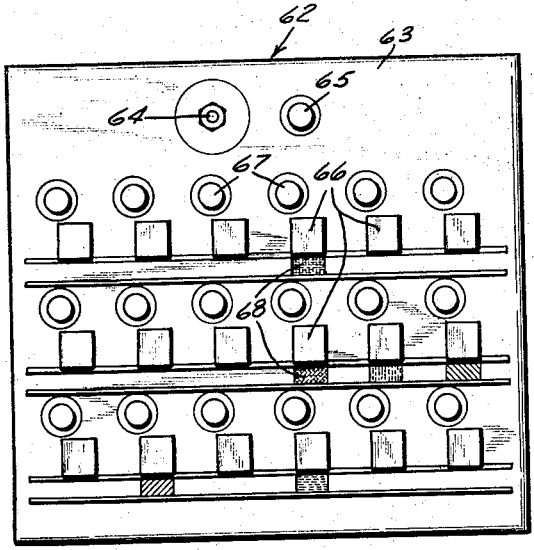
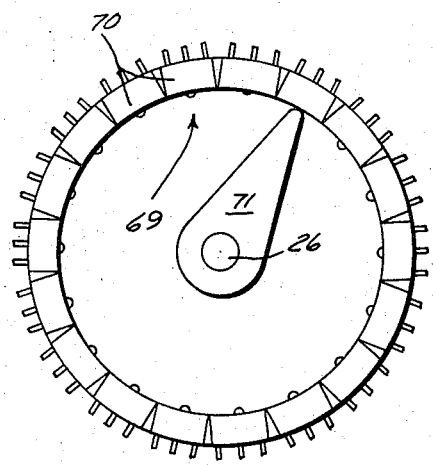
INVENTORS
PAUL C. NELSON
LEON E. RUTZ
BY *Hill, Sherman, Meroni, Gross & Simpson*     ATTORNEYS April 16, 1968 P. C. NELSON ET AL 3,377,887
TURRET PUNCH PRESS Filed May 11, 1965 3 Sheets-Sheet 2

INVENTORS
PAUL C. NELSON
LEON E. RUTZ

BY

ATTORNEYS

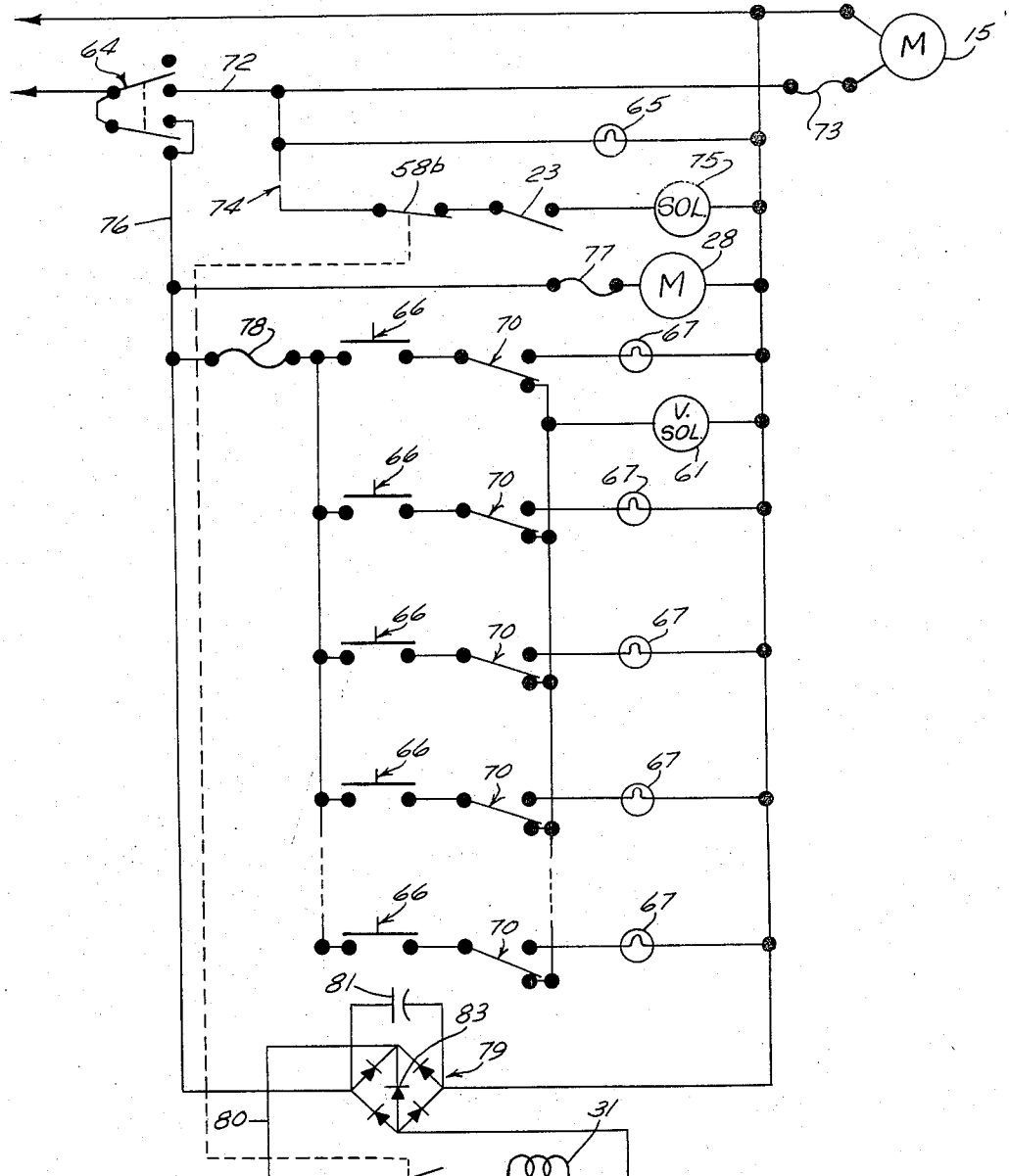

United States Patent Office 3,377,887
Patented Apr. 16, 1968

3,377,887
TURRET PUNCH PRESS
Paul C. Nelson, Lake City, and Leon E. Rutz, Goodhue, Minn., assignors to Houdaille Industries, Inc., Buffalo, N.Y., a corporation of Michigan
Filed May 11, 1965, Ser. No. 454,897
12 Claims. (Cl. 74—822)

ABSTRACT OF THE DISCLOSURE

A punch press has a pair of tool-supporting turrets, both connected by gearing to a shaft joined by a clutch to a motor. The turret clutch is powered by a circuit which includes, for each tool station, a normally open manual selector switch connected in electrical series with a normally closed switch opened by an actuator driven by the turret. The turrets are locked by a single linkage that controls vertically movable locking pins. Lamps indicate the positions and movements of the turrets.

This invention relates generally to turret punch presses, and more specifically to a control system by which the various stations on the turret means are individually positioned in alignment with the press ram.

Although the principles of the present invention may be included in various turret presses, a particularly useful application is made in a turret press of the stylus-operated type. In particular, when a template is employed with a workpiece-positioning mechanism to guide the position of the workpiece with respect to the punch press, the operator must not only move the workpiece to the various positions which are jointly established by the stylus and the template, but must also move the turret periodically so that the proper tooling is in operating position in accordance with the ultimate requirements for the workpiece. Repositioning of prior turrets has been slow, or sometimes inaccurate, particularly where many sizes of holes are involved. Coupled with these problems, when operations are sustained, is a considerable amount of worker fatigue.

The present invention contemplates the utilization of a motor to rotate the turret means, a station selector which may be manually operated to effect rotation of the turret means by the motor, and suitable switch means responsive to the angular position of the turret means and connected to effect cessation of rotation of the turret means when the proper station has arrived beneath the press ram.

Accordingly, it is an object of the present invention to provide a turret punch press wherein all turret movements are power-operated.

Another object of the present invention is to provide a control system for a turret punch press which will rapidly and accurately position the turret means in a selected position.

Yet another object of the present invention is to provide a control system for a turret press wherein the components utilized are of low cost and of simple construction.

A still further object of the present invention is to provide a control system for a turret punch press which will take over some of the work previously done by the operator, and therefore lessen worker fatigue.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

On the drawings:

FIG. 1 is a perspective view of a stylus-operated turret punch press equipped with a control system provided in accordance with the principles of the present invention;

FIG. 4 is a schematic diagram of the electrical circuit employed in the control system;

FIG. 5 is an enlarged elevational view of the station selector shown on the punch press of FIG. 1; and FIG. 6 is a top view diagrammatically illustrating the arrangement of the station switches employed in the control system.

As shown on the drawings:

Figure 2:
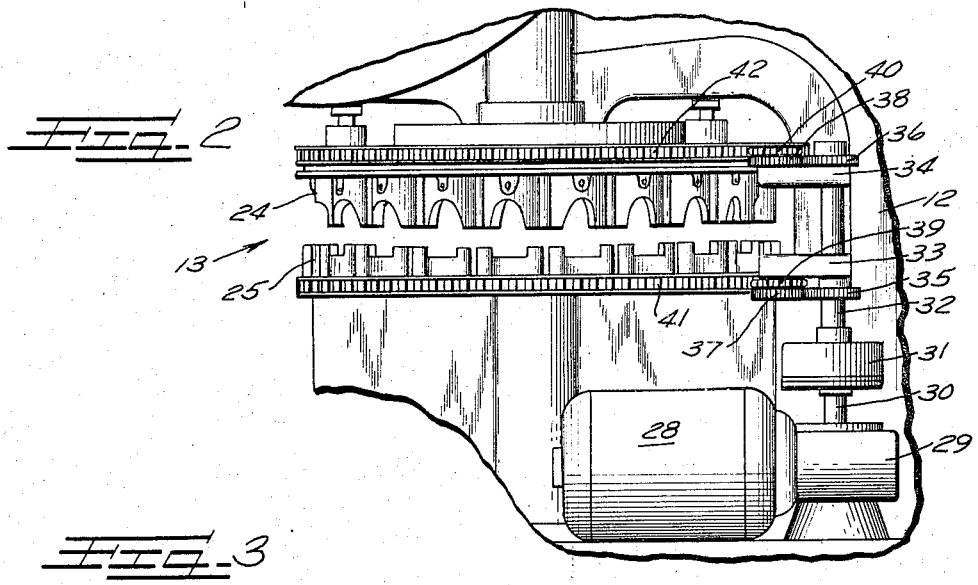
FIG. 2 is an enlarged elevational view of a fragmentary portion of that side of the punch press which is illustrated in FIG. 1.

The principles of this invention are particularly useful when embodied in a stylus-operated turret punch press such as illustrated in FIG. 1, generally indicated by the numeral 10. The turret punch press 10 includes a base 11 on which there is mounted a C-frame 12, in the opening of which there is provided a turret means generally indicated at 13. The press 10 includes a ram 14 (FIG. 3), driving power to which is provided by a main motor 15. A table 16 is supported on the base 11 and is additionally supported by an auxiliary stand 17. Table 16 is provided with a pair of side rails 18, 19 on which there is slidably supported a transversely extending bar 20. The bar 20 slidably supports for lateral movement a stylus assembly 21 which is arranged to overlie an appropriate template 22. The stylus housing 21 is provided with suitable clamps (not shown) which hold the workpiece for joint movement therewith, the table 16 additionally supporting the workpiece for reception into the turret means 13.

With the turret means 13 disposed in a selected position as described below, a workpiece (not shown) is moved about within the turret means 13 to various positions determined by coaction of a stylus 23 carried by the stylus housing 21 with the template 22. Lowering of the stylus 23 into one of the apertures of the template 22 closes a switch described below which controls delivery of power from the motor 15 to the ram 14. The stylus 23 is inserted into each of the template openings which correspond to all of the holes which are to be stamped in the workpiece by the turret-supported tooling then in registration with the punch ram 14. On completion of the making of these holes, the turret is advanced or rotated to another selected setting or angular position wherein tooling of a different size or shape is provided, thereby readying the turret press 10 for further punching on the workpiece. The circuit by which reciprocation of the ram is controlled, and the circuit by which the angular position of the turret means is controlled are described below.

As shown in FIG. 2, the turret means 13 comprises a pair of vertically spaced concentric turrets including an upper turret 24 and a lower turret 25. As the turret means 13 is devoid of any structure between the upper turret 24 and the lower turret 25, the workpiece may project between the turrets 24, 25 for a distance corresponding to the throat size of the C-frame 12. The upper turret 24 is rotatably mounted by means of a shaft 26 (FIG. 6) which is carried by the upper arm of the C-frame 12, and the lower turret 25 is similarly rotatably supported on the lower arm of the C-frame 12. The turret means 13 is provided with a number of stations, there being eighteen such stations in this embodiment. Each station comprises a suitable pocket in the upper turret 24 to suport a reciprocable punch, and a suitable pocket in the lower turret 25 to hold a relatively stationary die. The punches and dies are easily replaced, there being a limited number shown in FIG. 2 and a somewhat larger number of punches 27 illustrated in FIG. 3.

In this embodiment, the control system for the turret means includes a motor 28 which is drivingly connected to rotate the turret means 13. In this embodiment, such driving connection is provided by a speed reducer 29 which has an output shaft 30 which is parallel to and offset from the common axes of the turret means 13. The output shaft 30 is connected to one side of a normally disengaged clutch 31, the clutch 31 here comprising a magnetic clutch operated by direct current. The other side of the clutch 31 is connected to a drive shaft or timing shaft 32 which is concentric with the output shaft 30, and which thus is also parallel to and offset from the turret axis. The drive shaft 32 is provided with gear means for acting on the periphery of the turret means 13. To this end, the shaft 32 is rotatably supported by a pair of flanges 33, 34 which comprise a part of the C-frame 12. A lower gear 35 and an upper gear 36 are co-rotatably carried by and secured to the shaft 32, and the gears 35, 36 respectively engage a pair of intermediate gears 37, 38 also rotatably supported on the flanges 33, 34. A sprocket wheel 39 and a sprocket wheel 40 are respectively co-rotatable with the gears 37, 38, and respectively engage a pair of chains 41, 42 which are rigidly carried on the peripheries of the lower and upper turrets 25, 24. The chains 41, 42 are rigidly secured to the turret means 13 so that there is no relative movement therebetween. The motor 28 is normally continually operating or running, and when the clutch 31 is engaged the driving connection from the motor 28 to the turret means 13 is completed. Similarly when the clutch 31 is disengaged, rotation of the turret means 13 ceases. Normally, the turret means 13 is locked, and such rotation can take place only when the turret means 13 is unlocked and hence free to rotate.

Figure 3:
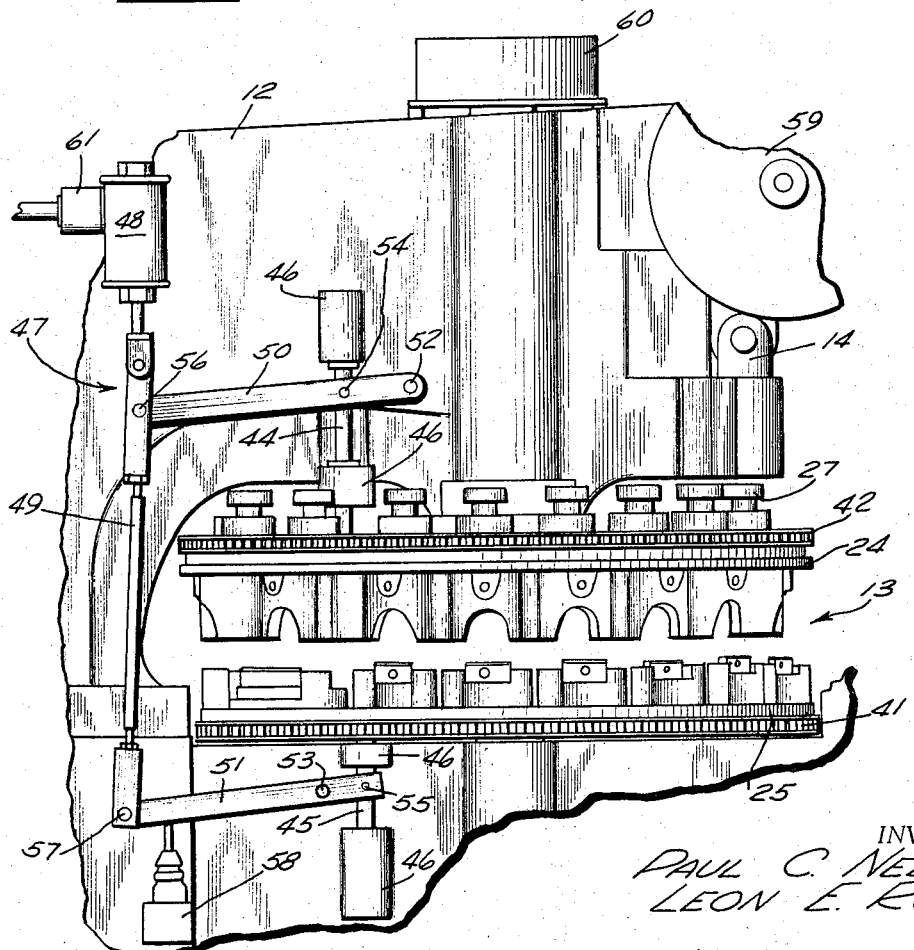
FIG. 3 is an enlarged fragmentary view of a portion of the punch press viewed from the side opposite to that shown in FIG. 1.

As shown in FIG. 3, the locking of the turret means 13 is provided by retractable locking pin means including an upper pin 44 and a lower pin 45 which normally engage in suitable recesses (not shown), one for each of the stations of the turret means 13. By such engagement, any rotation of the turret means 13 is prevented, and the center lines of the respective stations are precisely aligned, when locked, in the same angular position so that resetting of the template 22 is not necessary when the turret means 13 is indexed. The locking pins 44, 45 are slidably supported in a number of bosses 46 forming a part of the C-frame 12. The upper locking pin 44 is in a downward position and the lower locking pin 45 is in an upward position to lock the turret means 13. A reciprocably driven linkage generally indicated at 47 is provided to shift the pins 44, 45 simultaneously together or apart. The linkage 47 includes a suitable actuator 48, a connecting link 49, an upper pin-actuating lever 50, and a lower pin-actuating lever 51. The pin-actuating levers 50, 51 are pivotally supported on the C-frame, the lever 50 having a fulcrum 52 and the lever 51 having a fulcrum 53. The pin-actuating levers 50, 51 respectively have a driving connection 54, 55 with the locking pins 44, 45. There is sufficient clearance in the connections 54, 55 to preclude any binding. One end of each of the levers 50, 51 has a connection 56, 57 with the connecting link 49, which connections 56, 57 are pivotable. Note that one of the levers 51 has its pivotal support or fulcrum 53 disposed between its pin 45 and the connecting link 49, while the other of the levers 50 has its locking pin 44 disposed between its pivotal support or fulcrum 52 and the connecting link 49. The actuator 48 in this embodiment is a fluid actuator, and more specifically is a solenoid-operated pneumatic actuator. As illustrated, the actuator 48 is in its downward or extended position so that the locking pin 44 is forced downwardly into locking engagement with the upper turret 24, while the lower locking pin 45 is forced upwardly into the lower turret 25. A control switch 58 is carried by the C-frame 12 and its position is controlled by the linkage 47, and more specifically by the pin-actuating lever 51. The switch 58 serves to effect engagement of the clutch 31 by being in circuit with its control winding, and also provides a safety interlock in the circuit of the stylus 23, all as described below.

A hand wheel 59 is provided by which the ram 14 may be manually advanced for set-up purposes, checking and the like.

The shaft 26 (FIG. 6) with which the upper turret 24 is associated, extends upwardly through the upper arm of the C-frame 12 into a switch enclosure 60 within which there is disposed the structure described below and illustrated in FIG. 6.

The actuator 48 has a solenoid coil 61 which is under the control of a station selector generally indicated at 62 in FIGS. 1 and 5 to effect retraction of the locking pins 44, 45 and engaging of the clutch 31, and the solenoid coil 61 is under the further control of a station or position switch means 69 disposed within the switch housing 60 and illustrated in FIG. 6 to effect reengagement of the locking pins 44, 45 with the turret means 13 and to effect disengagement of the clutch 31.

As shown in FIG. 5, the station selector 62 includes a panel 63 on which there is mounted a master switch 64 and a master jewel 65 which, when illuminated, indicates that the stylus-controlled circuit for reciprocation of the ram is in a ready condition. The panel 63 also supports a series of 18 push-button type of station-selector switches 66, one for each station. Preferably, the switches 66 are of the latch-type, wherein the depression of one of the push-buttons thereof effects release of any previously depressed push-button. Such latch-type push-button switches are commercially available. On the same housing or panel 63, there is also provided lamp means for indicating that the turret means 13 has arrived at the selected station or angular position, that the locking pins 44, 45 have reengaged with the turret means 13, and that the stylus circuit is again ready for use. To this end, there is provided a lamp 67 adjacent to each of the push-buttons 66, the lamps 67 preferably being jeweled of a color different from that of the lamp or jewel 65. Suitable identification means are provided in conjunction with each of the station selector buttons 66. As illustrated, there is shown a number of tabs 68, each lined for a different color. Preferably, a corresponding color is provided on the template 22 adjacent to such template holes as are to be used to locate holes in the workpiece to be made by the tooling carried at such station. If desired, other indicia or identification may be employed to indicate to the operator what tooling is then present at each particular station. Depression of one of the buttons 66, or closing the switch associated therewith, thus effects rotation of the turret means 13 to bring the selected station in alignment with the ram 14.

The rotation is terminated by the arrival of the selected station into a position where it is aligned with the ram. Such termination is obtained by the position or station switch means 69 shown in FIG. 6. The station or position switch means 69 includes a series of station switches 70, one per station, and connected to the station selector 62. More specifically, the switches 70 are connected in circuit with the switches 66, and in this embodiment, in electrical series therewith. A switch actuating arm 71 is co-rotatably secured to and driven by the turret shaft 26, and thus the arm 71 is driven by the rotation of the turret. It has a radial length such that it successively actuates the various switches 70, each having a normally closed section, all but one of which is deenergized. The energized switch 70 so long as it keeps on conducting, enables turret rotation to continue. However, as soon as the switch that is associated with the selected station is actuated, it becomes deenergized and serves to terminate rotation of the turret means 13. Such termination occurs when the selected station is aligned with the ram 14.

To obtain this result, the station switches 70 are circularly arranged about the axis of the turret means 13, and the angular spacing between successive switches 70 corresponds to the angular spacing between successive tool-supporting stations. In this embodiment, such angles are identical. However, it is essential that such spacing be functionally similar. Thus the switch means 69 is responsive to the angular position of the turret means 13.

The components described may be advantageously electrically connected together as shown schematically in FIG. 4. The same numerals have been used to represent the corresponding elements. The main motor 15 is fused and is connected through one section of the switch 64 to a source of suitable alternating current. When the switch 64 is in its center or off position, or when it is in its upper position, no power is delivered to the motor 15. When the switch 64 is in its lowermost position, a line 72 is energized which is connected through a motor fuse 73 to the motor 15, is connected to the jewel lamp 65, and is connected to supply power to a circuit 74 for effecting reciprocation of the ram 14 under the control of the stylus 23. To this end, the circuit 74 includes a part of the control switch 58 which section thereof is closed when the locking pins 44, 45 are in a locked position. The circuit 74 includes a solenoid or coil 75 which is operative to clutch the output of the main motor 15 to the ram 14 whenever the stylus switch 23 is closed. Whenever the locking pins 44, 45 are retracted, there is no assurance that any punching station will be properly aligned with the ram 14, and hence the safety switch 58b will preclude any punching.

The other section of the main switch 64 is "off" in its center position, and energizes a line 76 in the other two positions. The upper position is a set-up position, and the lower position is the normal operating position. The energized line 76 brings power through a fuse 77 to the motor 28 so that it runs continually. The line 76 also brings power through a fuse 78 to one side of each of the station selector switches 66, while the other side of each of the station selector switches 66 is connected to the movable element of the position or station switch 70 which corresponds. Each of the station switches 70 comprises a normally closed switch, the stationary normally-closed contact of each of the switches 70 being connected together and being connected to a coil of the solenoid valve 61 that controls the pin-retracting actuator 48. Preferably, each of the position switches 70 comprises a single-pole double-throw switch, and each normally open contact is respectively connected to one of the jewel lamps 67 which thereby correspond to the selector switches 66 and the position or station switches 70.

The line 76 is also connected across a suitable full-wave rectifier generally indicated at 79, the elements of which are arranged to conduct current in a single direction through a line 80 and through another section of the control switch 58, and through the coil of the magnetic clutch 31. If desired, a filter capacitor 81 may be connected across the full-wave rectifier 79, while a further capacitor 82 across the clutch coil 31 will alter the self induction therein in a known manner. A further diode 83 of the Zener type is also connected across the clutch coil 31 in a normally nonconducting manner. Such diode 83 is selected so that its reverse break-down voltage is slightly greater than the normal voltage across the coil 31 so as to limit the level of voltage which may be applied thereto, and thus preclude any high voltage transients from reaching the clutch circuit 80. The particular diode 83 to be picked is dependent upon the characteristics of the coil 31 of the magnetic clutch.

When one of the push button switches 66 of the station selector 62 is depressed or closed, it serves to effect rotation of the turret means 13 by the motor 28. Such driving is obtained by engagement of the clutch 31 which, in this embodiment, is energized by the control switch 58 in response to retraction of the locking pin means 44, 45. Such retraction is obtained by driving the connecting link 49 in an upward direction to retract the pins 44, 48 thereby effecting closing of the switch section 58a and opening of the switch section 58b. Such actuation of the switch 58 disables the ram circuit 74 and initiates rotation of the turret means 13.

The station or position switch means 69 thus have the individual switches 70 connected to effect cessation of such rotation which is accomplished by termination of the drive of the turret means 13 by the motor 28. Such termination is effected by disengagement of the clutch 31, its coil being deenergized by opening of the switch section 58a. The control switch 58a is opened by the reengagement of the locking pin means 44, 45 with the turret means 13, which reengagement is effected by the driving of the connecting link 49 in the opposite or downward direction. Such movement is obtained by deenergizing the coil 61 which is in electrical series with the corresponding one of the positions which is 70, which is then conducting. When the turret means 13 has arrived at the proper angular position, the switch actuating arm 71 will actuate the corresponding switch 70 to interrupt the current to the coil 61 and to energize the corresponding lamp 67. Thus each of the the position or station switches 70 enables turret rotation when it is placed in a conducting circuit by the station selector switch 66 associated with it. Each of the station switches 70 enables retraction of the pin means 44, 45 when current flows therethrough and enables reengagement of the pin means 44, 45 when the current flow therethrough is interrupted.

If desired, the station selector 62 may be remotely mounted from the press 10 and the stylus switch 23 be replaced by another manually actuated switch.

Although various further minor modifications might be suggested by those versed in the art, it should be understood that we wish to embody within the scope of the patent warranted hereon all such embodiments as reasonably and properly come within the scope of our contribution to the art.

We claim as our invention:

1. A control system for a press having turret means provided with a series of tool-support stations positionable individually beneath the press ram, comprising in combination:
   (a) retractable locking pin means normally engaging the turret means and preventing rotation thereof;
   (b) a station selector connected to effect retraction of said locking pin means;
   (c) a normally continually operating turret motor;
   (d) a rotatable turret shaft drivingly connected to rotate the turret means;
   (e) a normally disengaged turret clutch for connecting said motor to said rotatable shaft, said turret clutch being energized in response to retraction of said locking pin means; and
   (f) switch means, responsive to the angular position of the turret means, connected to effect disengagement of said clutch and hence of said rotation, and to effect reengagement of said locking pin means with the turret means.

2. A control system for a press having a pair of vertically spaced concentric turrets jointly provided with a series of tool-support stations positionable individually beneath the press ram, comprising in combination:
   (a) a pair of locking pins respectively normally engaging the turrets and preventing rotation thereof, said pins being retractible in opposite directions therefrom;
   (b) a reciprocably driven connecting link;
   (c) a pair of pivotally supported pin-actuating levers respectively drivingly connected to said pins, and one end of each of said levers pivotally connected to said connecting link, one of said levers having its pivotal support between its pin and said connecting link, and the other of said levers having its pin between its pivotal support and said connecting link;
   (d) a station selector connected to effect driving of said connecting link in one direction to retract said pins;

(e) a motor drivingly connected to rotate the turret means concurrently with retraction of said locking pins; and (f) switch means, responsive to the angular position of the turrets, connected to effect driving of said connecting link in the opposite direction to effect termination of driving of said turrets by said motor, and to reengage said locking pins with the turrets.

3. A control system for a press having a pair of vertically spaced concentric turrets jointly provided with a series of tool-support stations positionable individually beneath the press ram, comprising in combination:
(a) a pair of locking pins respectively normally engaging the turrets and preventing rotation thereof, said pins being retractible in opposite directions therefrom;
(b) a reciprocably driven linkage operative to shift said pins in either the direction of retraction or reengagement simultaneously;
(c) a station selector connected to effect driving of said linkage in one direction to retract said pins;
(d) a motor drivingly connected to rotate the turret means concurrently with retraction of said locking pins; and
(e) switch means, responsive to the angular position of the turrets, connected to effect driving of said linkage in the opposite direction to effect termination of driving of said turrets by said motor, and to re-engage said locking pins with the turrets.

4. A control system for a press having turret means provided with a series of tool-support stations positionable individually beneath the press ram, comprising in combination:
(a) a motor drivingly connected to rotate the turret means;
(b) a station selector including for each station a selector switch connected to effect rotation of the turret means by said motor; and
(c) a series of switches, one for each of the stations, respectively connected in electrical series with said selector switches, and the corresponding one of which is opened, in response to the selected station being aligned by the turret means with the ram, to effect cessation of said rotation.

5. A control system for a press having turret means provided with a series of tool-support stations positionable individually beneath the press ram, comprising in combination:
(a) a motor drivingly connected to rotate the turret means;
(b) a station selector connected to effect rotation of the turret means by said motor;
(c) a stationary series of circularly arranged switches disposed about the rotational axis of the turret means, and functionally angularly spaced from each other by an amount corresponding to the angular spacing between the tool-support stations, said switches being normally closed and connected to said station selector in such manner that only one of said switches when opened, will effect cessation of said rotation; and
(d) a switch actuating arm driven by rotation of said turret means and operative to successively open each of said circularly arranged normally closed switches.

6. A control system for a press having turret means provided with a series of tool-support stations positionable individually beneath the press ram, comprising in combination:
(a) a motor drivingly connected to rotate the turret means;
(b) a station selector connected to effect rotation of the turret means by said motor;
(c) a circularly arranged series of normally closed switches, each one corresponding to one of the tool-support stations, each being placeable by said station selector in circuit when closed to enable rotation of the turret means; and
(d) a switch actuating arm driven by rotation of said turret means and operative to successively open each of said circularly arranged switches to effect termination of such rotation with the selected station aligned with the ram.

7. A control system for a press having turret means provided with a series of tool-support stations positionable individually beneath the press ram, comprising in combination:
(a) a circuit for controlling reciprocation of said ram;
(b) retractible locking pin means normally engaging the turret means and preventing rotation thereof;
(c) a station selector connected to effect retraction of said locking pin means;
(d) a motor drivingly connected to rotate the turret means;
(e) a control switch responsive to movement of said locking pin means, said control switch including a first section which is closed in response to retraction of said pin means to effect rotation of the turret means by said motor, and a second section which simultaneously therewith opens and is disposed in said ram circuit; and
(f) switch means, responsive to the angular position of the turret means, connected to effect termination of driving of said turret means by said motor, and to effect reengagement of said locking pin means with the turret means.

8. A control system for a press having turret means provided with a series of tool-support stations positionable individually beneath the press ram, comprising in combination:
(a) a motor drivingly connected to rotate the turret means;
(b) a station selector including for each station a manual selector switch connected to enable rotation of the turret means by said motor;
(c) lamp means; and
(d) a series of switches, one for each of the stations, respectively connected in electrical circuit with said selector switches, and the corresponding one of which is actuated, in response to the selected station being aligned by the turret means with the ram, to effect cessation of said rotation and to energize said lamp means.

9. A control system for a press having turret means provided with a series of tool-support stations positionable individually beneath the press ram, comprising in combination:
(a) a motor drivingly connected to rotate the turret means;
(b) a station selector including for each station a manual selector switch connected to enable rotation of the turret means by said motor;
(c) a lamp for each station; and
(d) a series of switches, one for each of the stations, respectively connected in electrical circuit with said selector switches, and the corresponding one of which is actuated, in response to the selected station being aligned by the turret means with the ram, to effect cessation of said rotation and to energize the corresponding one of said lamps.

10. A control system for a press having turret means provided with a series of tool-support stations positionable individually beneath the press ram, comprising in combination:
(a) a normally continually operating motor;
(b) a rotatable shaft drivingly connected to rotate the turret means;
(c) a normally disengaged clutch for connecting said motor to said rotatable shaft;

(d) retractible locking pin means normally engaging the turret means and preventing rotation thereof;
(e) a station selector including for each station a selector switch connected to effect retraction of said locking pin means;
(f) a control switch responsive to retraction of said locking pin means and connected to effect engaging of said clutch and hence rotation of the turret means by said motor; and
(g) a series of station switches, one for each station, each respectively connected in circuit with the corresponding one of the selector switches, each of said station switches being responsive to an angular position of the turret means, and operative, when current therethrough is interrupted to effect re-engagement of said locking pin means, and to effect actuation of said control switch to disengage said clutch.

11. A control system for a press having a pair of turrets provided with a series of tool-support stations positionable individually beneath the press ram, comprising in combination:
(a) a normally continually operating motor;
(b) a shaft disposed immediately adjacent to the turrets and supported for rotation about an axis parallel to and offset from the rotational axis of the turrets;
(c) gear means all of which are driven by said shaft, and in mesh with the outer peripheries of both of said turrets to directly rotatably drive both of the turrets;
(d) a normally disengaged clutch having a portion carried by said shaft and rotatable about the rotational axis of said shaft for connecting said motor to said rotatable shaft;
(e) a station selector connected to effect engagement of said clutch and hence rotation of said clutch section and rotation of the turrets by said motor; and
(f) switch means, responsive to the angular position of the turrets, connected to effect disengagement of said clutch and hence termination of said rotation of said clutch section.

12. A control system for a press having a pair of vertically spaced concentric turrets jointly provided with a series of tool-support stations positionable individually beneath the press ram, comprising in combination:
(a) a normally continually operating motor;
(b) a speed reducer driven by said motor and having an output shaft whose rotational axis is disposed immediately adjacent to the turrets and parallel to and offset from the rotational axis of the turrets;
(c) a timing shaft supported for rotation concentrically with said output shaft of said speed reducer;
(d) gear means on said timing shaft and corotatable therewith to be driven by said timing shaft, said gear means being operative through idler gears in mesh with the peripheries of both of the turrets to directly rotate both of them simultaneously;
(e) a normally disengaged clutch having sections respectively carried by said shafts and rotatable about the rotational axis of said shafts for connecting said output shaft to said timing shaft;
(f) a station selector connected to effect engagement of said clutch and hence corotation of said clutch sections and rotation of the turrets by said motor; and
(g) switch means, responsive to the angular position of the turrets, connected to effect disengagement of said clutch and hence termination of said rotation of said clutch section carried by said timing shaft.

References Cited

UNITED STATES PATENTS 2,363,208 11/1944 Sulzer _____ 83—552
2,748,864 6/1956 Ewaldson et al. _____ 83—524
2,958,247 11/1960 Levine _____ 83—552

FOREIGN PATENTS 941,248 11/1963 Great Britain.

FRED C. MATTERN, JR., *Primary Examiner.*